Jan. 9, 1923.
W. R. McGOWEN.
MOTOR VEHICLE.
FILED JAN. 24, 1921.
1,441,515
2 SHEETS-SHEET 1
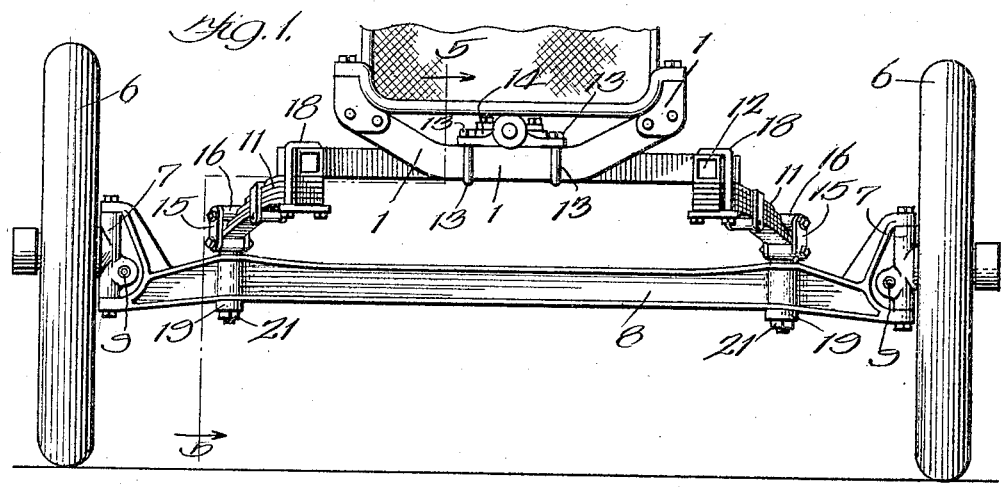
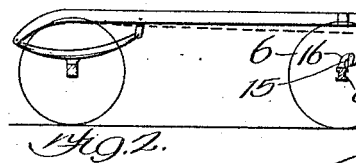
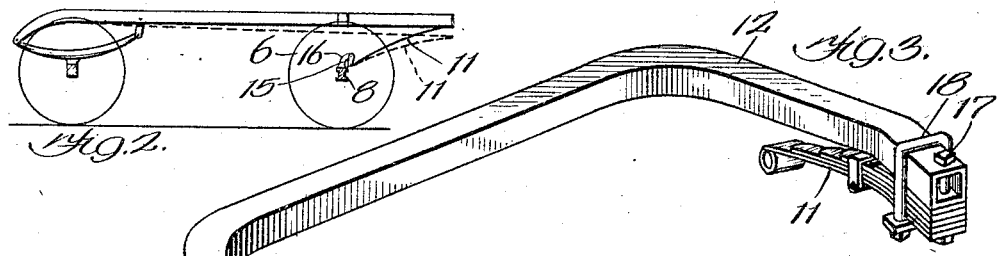
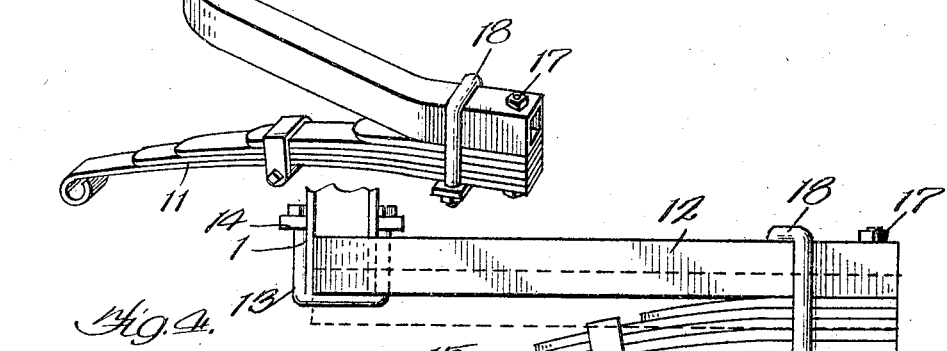
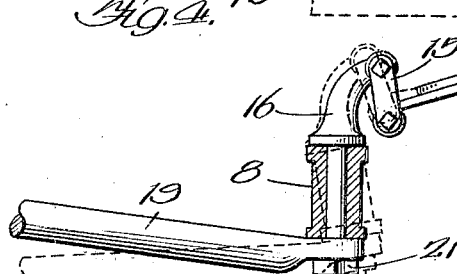
Inventor:
William R. McGowen
By G. L. Gragg
Atty.

Jan. 9, 1923.
W. R. McGOWEN.
MOTOR VEHICLE.
FILED JAN. 24 1921.
1,441,515
2 SHEETS-SHEET 2
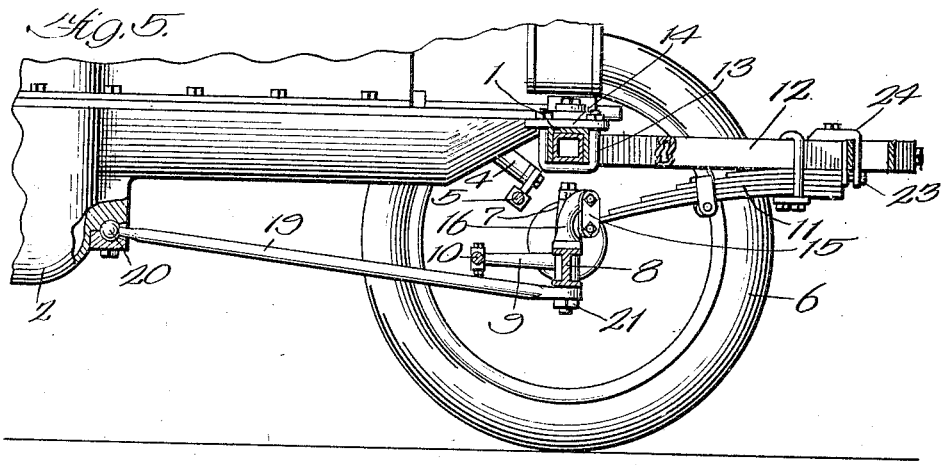
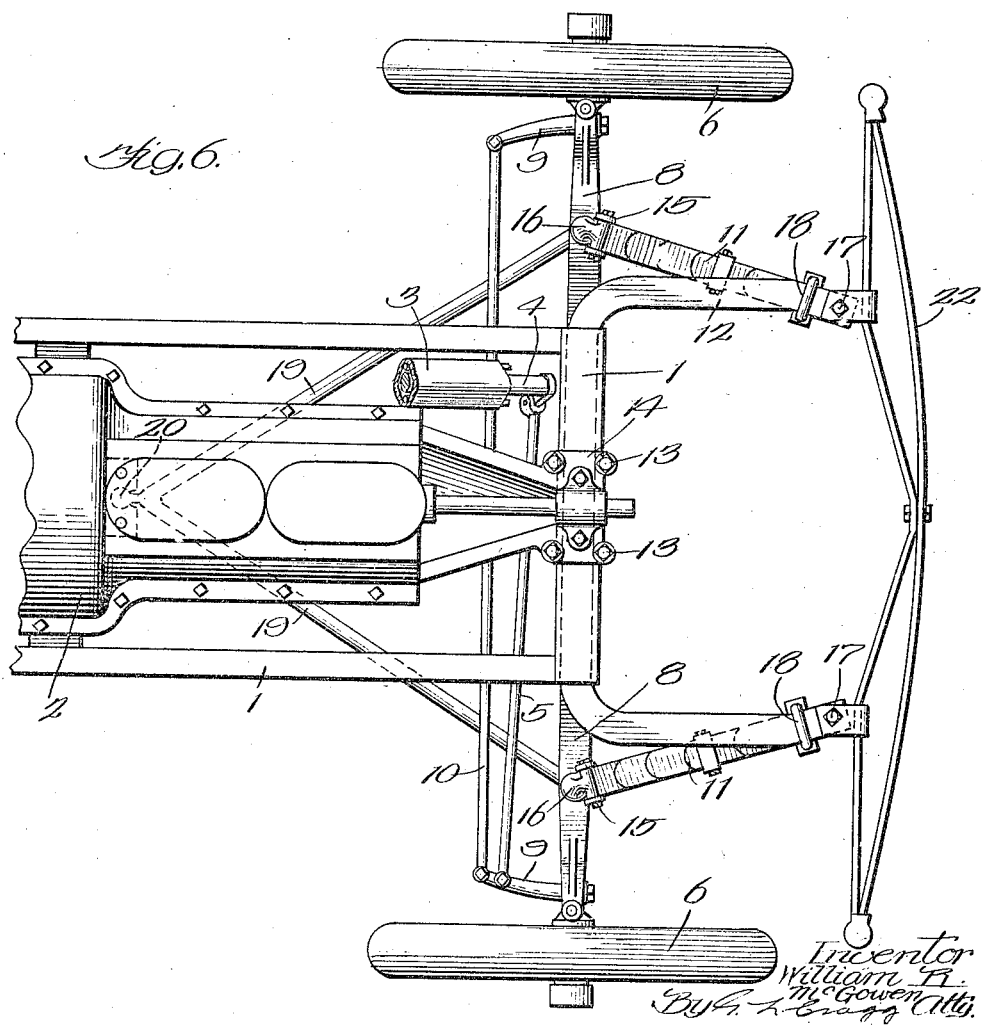
Inventor
William R. McGowen Patented Jan. 9, 1923.

1,441,515

UNITED STATES PATENT OFFICE.

WILLIAM R. McGOWEN, OF CHICAGO, ILLINOIS.

MOTOR VEHICLE.

Application filed January 24, 1921. Serial No. 439,367.

*To all whom it may concern:*

Be it known that I, WILLIAM R. Mc-GOWEN, citizen of the United States, residing at Chicago, in the county of Cook and State of Illinois, have invented a certain new and useful Improvement in Motor Vehicles, of which the following is a full, clear, concise, and exact description.

My invention relates to motor vehicles and has for one of its objects the provision of means whereby the extent of the base of the spring support for the chassis of a motor vehicle may be increased longitudinally of the vehicle. To this end I interpose a spring member between the chassis frame and either vehicle wheel axle, this spring member being inclusive of two portions extending longitudinally of the vehicle outwardly beyond the chassis frame and assembled together at their outer ends and respectively connected at their inner ends with the chassis frame and said axle. In addition to accomplishing the aforesaid object of my invention I preferably employ the spring extending means in such a manner that it will protect the radius rods that connect the axle of the steering vehicle wheels with the chassis frame from undue distorting and crystallizing strains.

When the invention is so embodied as to guard the radius rods from undue strain the spring member is interposed between the forward vehicle wheel axle and the chassis frame, the steering vehicle wheels being mounted as usual upon this axle. In the preferred embodiment of the invention the spring member includes two leaf springs or sets of leaf springs and a rigid bar portion of U-shape whose base is connected with the chassis frame and whose sides are respectively above the leaf springs that also project outwardly from and longitudinally of the chassis frame, the outer ends of the sides of the rigid bar portion being respectively rigidly assembled with the outer ends of the leaf spring. Shackles connect the inner ends of said springs with said axle. The outer ends of the sides of the rigid bar portion of U-form are preferably employed as a mounting for a bumper.

I will explain my invention more fully by reference to the accompanying drawings showing the preferred embodiment thereof and in which Fig. 1 is a front end view of a motor vehicle equipped in accordance with the invention; Fig 2 is a view, somewhat diagrammatic, showing the motor vehicle in side elevation; Fig. 3 is a perspective view of the spring member by means of which the longitudinal extent of the spring base is increased; Fig. 4 is a side view of the spring member shown in connection with parts contiguous thereto; Fig. 5 is a view on line 5—5 of Fig. 1, the rear portion of the motor vehicle being omitted; and Fig. 6 is a plan view of the structure appearing in Fig. 5.

Like parts are indicated by similar characters of reference throughout the different figures.

A chassis frame 1 is of any usual or suitable construction, this frame supporting, among other things, the casing 2 of the engine and the steering column 3 through which any usual or suitable steering post 4 is passed into connection with a link 5 which is so coupled with the steering vehicle wheels 6 as to govern the planes of rotation thereof. Each of these steering vehicle wheels is mounted to turn, in accordance with common practice, upon a stub shaft which carries an upright bearing 7 journaled to turn, about an upright axis, upon an end of the steering vehicle wheel axle 8. Each of these bearings carries a finger 9 projecting rearwardly therefrom, the aforesaid link 5 being connected to one of these fingers, both fingers being connected by another link 10 whereby any steering movement imparted from the steering post 4 through the link 5 is communicated to both steering vehicle wheels 6 to cause the planes of rotation of these wheels to be changed, while remaining substantially parallel, to suit the direction in which the vehicle is to travel. In accordance with my invention a spring member is interposed between one end of the chassis frame and the contiguous axle and when the inventiton is so embodied as to further the protection of the radius rods such spring member is interposed between the chassis frame 1 and the front steering vehicle wheel axle 8.

The spring member employed is preferably inclusive of two compound leaf springs 11 and a rigid bar portion 12 that is of U-form. The base of the U-shaped bar portion 12 is received within the channel of the front side of the chassis frame 1, the base being maintained in assembly with the chassis frame by means of the U-bolts 13 that embrace the front side of the frame and the base of the U-shaped portion 12, these U-bolts also passing through a portion 14 that cooperates with the U-bolts to hold the U-shaped part and the chassis frame in assembly. In the embodiment of the invention illustrated the portion 14 is also an integral part of the engine casing 2 whereby the U-bolts 13 also serve to hold the engine casing and the chassis frame in assembly. The sides of the U-shaped portion 12 project outwardly from and longitudinally of the chassis frame and are located above the compound leaf springs 11 that also project outwardly from and longitudinally of the chassis frame. Shackles 15 have their lower ends in swinging connection with the inner ends of the leaf springs 11 and their upper ends in swinging connection with the upper ends of the posts 16 that pass through and are bolted to the steering vehicle wheel axle 8. The outer ends of said springs are rigidly secured to the outer ends of the sides of the U-shaped portion 12 by means of the straight bolts 17 and the U-bolts 18. The rearwardly converging radius rods 19 desirably have common universal connection at 20 with the chassis frame. In the embodiment of the invention illustrated the joint at 20 is made directly with the casing 2 of the engine but as this casing is in rigid connection with the chassis frame the radius rods are thereby universally connected with the chassis frame at their rear ends.

In the preferred embodiment of the invention the forward ends of the radius rods are bolted to the bottom sides of the steering vehicle wheel axle 8 by means of the nuts 21 that are in threaded connection with the lower ends of the posts 16 that pass through said axle and the forward ends of the radius rods.

The outer ends of the U-shaped portion 12 of the spring structure are well adapted to serve as supports for a bumper 22 assembled therewith by the bolts 17 and 23 in conjunction with the straps 24.

By increasing the length of the spring base in interrelation to the wheel base by the device of my invention, the upright movement of the chassis frame, where vertically aligned with the steering vehicle wheel axle 8, is reduced in extent as compared with the upright movement of the forward or outermost ends of the spring structure 11, 12 for any given action of the spring as will readily be understood by reference to the diagram of Fig. 2, with the attendant advantages that will be understood by those skilled in the art, the shackles 15 so assembling the leaf spring portions of the spring member as to permit of the suitable action of the spring in response to road shocks without imposing unduly injurious strains upon the radius rods and without disturbing the co-operative interrelation of the steering vehicle wheel axle 8 with the radius rods and the steering mechanism. The shackles 15 permit the free up and down movement of the radius rods and slight turning movements of the steering vehicle wheel axle so that neither the axle nor the springs will bind the forward ends of the radius rods in a manner to resist the up and down movements of the outer ends of such rods which would result in buckling or distorting strains thereon. By placing the springs forward of the steering vehicle wheel axle 8 they are removed from the range of water that might overflow from the radiator, if the engine be water cooled. The cantilever spring suspension 11, 12 illustrated affords a very substantial foundation or support for the bumper guard 22, the spring structure absorbing much of the bumper shocks in their passage to the chassis frame. The force of the bumps upon the bumper is not sustained by the radius rods owing to the shackles whereby breakage of the engine crank case and of the radius rods is avoided.

The cantilever spring suspension of my invention also serves largely to eliminate or materially reduce the sidewise movements of the chassis frame with respect to the vehicle wheels. Any such sidewise movement of the chassis frame with respect to the vehicle wheels would be accompanied by similar movement of the steering post 4 which would cause movement of the link 5 with a consequent undesired change of the planes in which the steering vehicle wheels rotate requiring correction on the part of the chauffeur by adjustment of his hand steering wheel. In the device of my invention the direction of movement of the shackles 15 is such as to prevent or materially reduce the lateral movements of the chassis frame with respect to the vehicle wheels whereby the chassis frame is substantially confined to the line of travel which is determined by the steering mechanism.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a motor vehicle, the combination with a chassis frame; of a spring member interposed between said frame and the forward vehicle wheel axle, said spring member being inclusive of two leaf springs projecting outwardly from and longitudinally of the chassis frame and a rigid bar portion of U-form whose base is connected with the chassis frame and whose sides are respectively above the leaf springs and also project outwardly from and longitudinally of the chassis frame, the outer ends of the sides of the rigid bar portion being respectively rigidly assembled with the outer ends of the leaf springs; shackles connecting the inner ends of said springs with said axle; bearings upon the ends of said axle that connect the forward vehicle wheels therewith and which afford upright axes upon which said vehicle wheels may be turned to change their planes of rotation to constitute them steering vehicle wheels; steering mechanism for changing the planes of rotation of said steering vehicle wheels; radius rods connecting end portions of said axle with the chassis frame; and a bumper mounted upon the outer ends of the sides of the U-shaped bar portion.

2. In a motor vehicle, the combination with a chassis frame; of a spring member interposed between said frame and the forward vehicle wheel axle, said spring member being inclusive of two leaf springs projecting outwardly from and longitudinally of the chassis frame and respectively connected at their inner ends with end portions of said axle and a rigid bar portion of U-form whose base is connected with the chassis frame and whose sides are respectively above the leaf springs and also project outwardly from and longitudinally of the chassis frame, the outer ends of the sides of the rigid bar portion being respectively rigidly assembled with the outer ends of the leaf springs; bearings upon the ends of said axle that connect the forward vehicle wheels therewith and which afford upright axes upon which said vehicle wheels may be turned to change their planes of rotation to constitute them steering vehicle wheels; steering mechanism for changing the planes of rotation of said steering vehicle wheels; radius rods connecting end portions of said axle with the chassis frame; and a bumper mounted upon the outer ends of the sides of the U-shaped bar portion.

3. In a motor vehicle, the combination with a chassis frame; of a spring member interposed between said frame and the forward vehicle axle, said spring member being inclusive of two springs projecting outwardly from and longitudinally of the chassis frame and a rigid bar portion of U-form whose base is connected with the chassis frame and whose sides are respectively above the leaf springs and also project outwardly from and longitudinally of the chassis frame, the outer ends of the sides of the rigid bar portion being respectively rigidly assembled with the outer ends of the leaf springs; shackles connecting the inner ends of said springs with said axle; bearings upon the ends of said axle that connect the forward vehicle wheels therewith and which afford upright axes upon which said vehicle wheels may be turned to change their planes of rotation to constitute them steering vehicle wheels; steering mechanism for changing the planes of rotation of said steering vehicle wheels; and radius rods connecting end portions of said axle with the chassis frame.

4. In a motor vehicle, the combination with a chassis frame; of a spring member interposed between said frame and the forward vehicle wheel axle, said spring member being inclusive of two leaf springs projecting outwardly from and longitudinally of the chassis frame and respectively connected at their inner ends with end portions of said axle and a rigid bar portion of U-form whose base is connected with the chassis frame and whose sides are respectively above the leaf springs and also project outwardly from and longitudinally of the chassis frame, the outer ends of the sides of the rigid bar portion being respectively rigidly assembled with the outer ends of the leaf springs; bearings upon the ends of said axle that connect the forward vehicle wheels therewith and which afford upright axes upon which said vehicle wheels may be turned to change their planes of rotation to constitute them steering vehicle wheels; steering mechanism for changing the planes of rotation of said steering vehicle wheels; and radius rods connecting end portions of said axle with the chassis frame.

5. In a motor vehicle, the combination with a chassis frame; of a spring member interposed between said frame and a vehicle wheel axle, said spring member being inclusive of two leaf springs projecting outwardly from and longitudinally of the chassis frame; a rigid bar portion of U-form whose base is connected with the chassis frame and whose sides are respectively above the leaf springs and also project outwardly from and longitudinally of the chassis frame, the outer ends of the sides of the rigid bar portion being respectively rigidly assembled with the outer ends of the leaf springs; shackles connecting the inner ends of said springs with said axle; and a bumper mounted upon the the outer ends of the sides of the U-shaped bar portion.

6. In a motor vehicle, the combination with a chassis frame; of a spring member interposed between said frame and a vehicle wheel axle, said spring member being inclusive of two leaf springs projecting outwardly from and longitudinally of the chassis frame and respectively connected at their inner ends with end portions of said axle; a rigid bar portion of U-form whose base is connected with the chassis frame and whose sides are respectively above the leaf spring and also project outwardly from and longitudinally of the chassis frame, the outer ends of the sides of the rigid bar portion being respectively rigidly assembled with the outer ends of the leaf springs; and a bumper mounted upon the outer ends of the sides of the U-shaped bar portion.

7. In a motor vehicle, the combination with a chassis frame; of a spring member interposed between said frame and a vehicle axle, said spring member being inclusive of two leaf springs projecting outwardly from and longitudinally of the chassis frame, a rigid bar portion of U-form whose base is connected with the chassis frame and whose sides are respectively above the leaf springs and also project outwardly from and longitudinally of the chassis frame, the outer ends of the sides of the rigid bar portion being respectively rigidly assembled with the outer ends of the leaf springs; and shackles connecting the inner ends of said springs and said axle.

8. In a motor vehicle, the combination with a chassis frame; of a spring member interposed between said frame and a vehicle wheel axle, said spring member being inclusive of two leaf springs projecting outwardly from and longitudinally of the chassis frame and respectively connected at their inner ends with end portions of said axle, and a rigid bar portion of U-form whose base is connected with the chassis frame and whose sides are respectively above the leaf springs and also project outwardly from and longitudinally of the chassis frame, the outer ends of the sides of the rigid bar portion being respectively rigidly assembled with the outer ends of the leaf springs.

In witness whereof, I hereunto subscribe my name this twenty ninth day of December A. D., 1920.

WILLIAM R. McGOWEN.